US012800976B2

(12) United States Patent
Misawa et al.

(10) Patent No.: US 12,800,976 B2
(45) Date of Patent: Nov. 17, 2026

(54) OPTICAL MODULATOR

(71) Applicant: Sumitomo Electric Industries, Ltd., Osaka (JP)

(72) Inventors: Taichi Misawa, Osaka (JP); Keiji Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 303 days.

(21) Appl. No.: 18/636,972

(22) Filed: Apr. 16, 2024

(65) Prior Publication Data

US 2024/0353730 A1 Oct. 24, 2024

(30) Foreign Application Priority Data

Apr. 19, 2023 (JP) ................................ 2023-068313

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01)

(58) Field of Classification Search
CPC ........... G02F 1/025; G02F 1/212; G02F 1/225
See application file for complete search history.

(56) References Cited

U.S. PATENT DOCUMENTS 5,566,257 A * 10/1996 Jaeger .................. G02F 1/0356 385/2
6,310,700 B1 * 10/2001 Betts ..................... G02F 1/2255 359/2
2003/0133176 A1 * 7/2003 Abeles ................. G02F 1/2255 359/240
2011/0135242 A1 * 6/2011 Prosyk .................... G02F 1/225 385/3
2018/0246351 A1 * 8/2018 Ho ...................... G02F 1/01708
2019/0094649 A1 3/2019 Kono et al.

FOREIGN PATENT DOCUMENTS

JP 2015148711 A 8/2015
JP 2019056881 A 4/2019

* cited by examiner

*Primary Examiner* — Charlie Y Peng
(74) *Attorney, Agent, or Firm* — Volpe Koenig

(57) ABSTRACT

An optical modulator according to an embodiment includes: an optical waveguide including a first waveguide portion, a second waveguide portion, a third waveguide portion, a bending portion, and a differential signal path including a first signal line and a second signal line for driving the optical waveguide. The differential signal path includes a first transmission line, a second transmission line, and an intersecting conductor portion in the bending portion, the first transmission line being configured with the first signal line and the second signal line, the second transmission line being configured with the first signal line and the second signal line, and the intersecting conductor portion connecting the first transmission line and the second transmission line to each other. At least one of the first transmission line and the second transmission line includes a slow wave line.

12 Claims, 9 Drawing Sheets

OPTICAL MODULATOR

CROSS-REFERENCE TO RELATED APPLICATION

This application claims priority from Japanese Patent Application No. 2023-068313, filed on Apr. 19, 2023, the entire subject matter of which is incorporated herein by reference.

TECHNICAL FIELD

The present disclosure relates to an optical modulator.

BACKGROUND

Japanese Unexamined Patent Publication No. 2019-56881 discloses a Mach-Zehnder modulator. The Mach-Zehnder modulator includes a first arm waveguide, a second arm waveguide, and a differential signal path. Each of the first arm waveguide and the second arm waveguide includes a first waveguide portion extending in a direction of a first axis, a second waveguide portion extending in a direction of a second axis, and a third waveguide portion bent so as to optically couple the first waveguide portion to the second waveguide portion. The differential signal path includes a first signal line, a second signal line, and a reference potential line. A first intersecting conductor portion of the first signal line and a second intersecting conductor portion of the second signal line include an upper conductor layer and a lower conductor layer. The upper conductor layer is spaced apart from the lower conductor layer. The first signal line and the second signal line intersect each other in the upper conductor layer and the lower conductor layer.

Japanese Unexamined Patent Publication No. 2015-148711 discloses a semiconductor Mach-Zehnder optical modulator. The semiconductor Mach-Zehnder optical modulator includes an input waveguide, a plurality of optical waveguides optically coupled to the input waveguide, an output waveguide, and a plurality of traveling wave type electrodes formed on the optical waveguide. Each traveling wave type electrode applies a voltage of opposite phase to each optical waveguide. Each traveling wave type electrode is configured to form a coplanar strip line that performs impedance matching and velocity matching between an optical wave and an electric wave within the optical modulator.

SUMMARY

An optical modulator according to the present disclosure includes: an optical waveguide including a first waveguide portion extending in a first direction, a second waveguide portion extending in a second direction being a direction different from the first direction, and a third waveguide portion bent so as to optically couple the first waveguide portion to the second waveguide portion, a bending portion including the third waveguide portion; and a differential signal path including a first signal line and a second signal line for driving the optical waveguide. The differential signal path includes: a first transmission line, a second transmission line, and an intersecting conductor portion in the bending portion, the first transmission line being configured with the first signal line and the second signal line, each extending in the first direction; the second transmission line being configured with the first signal line and the second signal line, each extending in a third direction being a direction intersecting both the first direction and the second direction, and the intersecting conductor portion connecting the first transmission line and the second transmission line to each other. At least one of the first transmission line and the second transmission line includes a slow wave line.

DETAILED DESCRIPTION

Figure 1:
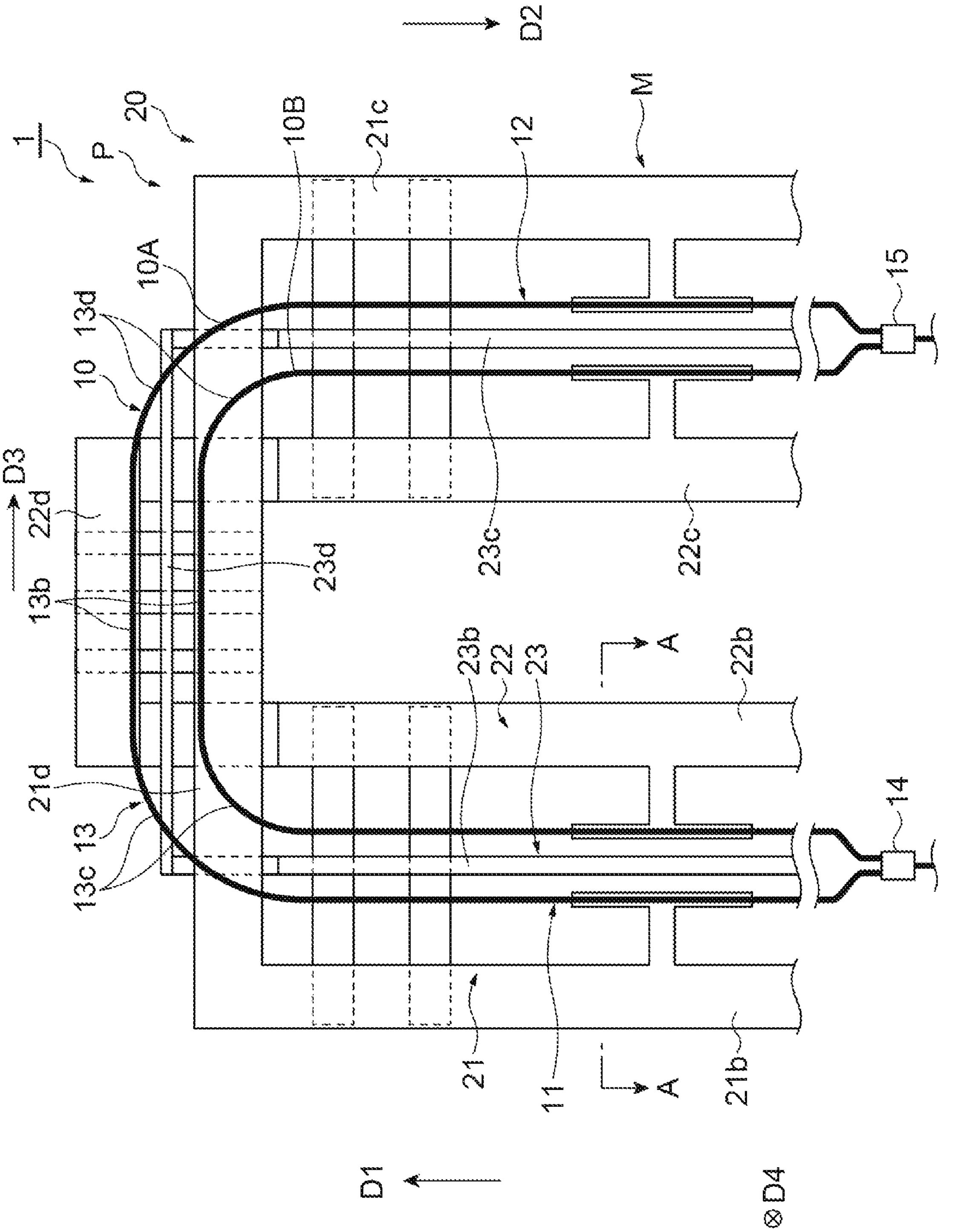
FIG. 1 is a plan view illustrating an optical waveguide and a differential signal path of an optical modulator according to an embodiment.

When an optical modulator has a bending portion which is a portion that bends an electric line and an optical waveguide, it may be necessary to align phases of electricity and light at input and output portions of the bending portion. When a propagation time of an optical signal is longer than a propagation time of an electrical signal at the bending portion, a phase shift may occur between the optical signal and the electrical signal at the output portion of the bending portion. Therefore, phase matching that prevents the phase shift from occurring at the output portion of the bending portion may be required.

The present disclosure is to provide an optical modulator capable of phase matching between an optical signal and an electrical signal at a bending portion.

According to the present disclosure, phase matching between an optical signal and an electrical signal is possible at the bending portion.

DESCRIPTION OF EMBODIMENTS OF PRESENT DISCLOSURE

First, embodiments of an optical modulator according to the present disclosure will be listed and described. An optical modulator according to the embodiment includes: (1) an optical waveguide including a first waveguide portion extending in a first direction, a second waveguide portion extending in a second direction being a direction different from the first direction, and a third waveguide portion bent so as to optically couple the first waveguide portion to the second waveguide portion, a bending portion including the third waveguide portion; and a differential signal path including a first signal line and a second signal line for driving the optical waveguide. The differential signal path includes: a first transmission line, a second transmission line, and an intersecting conductor portion in the bending portion, the first transmission line being configured with the first signal line and the second signal line, each extending in the first direction; the second transmission line being configured with the first signal line and the second signal line, each extending in a third direction being a direction intersecting both the first direction and the second direction, and the intersecting conductor portion connecting the first transmission line and the second transmission line to each other. At least one of the first transmission line and the second transmission line includes a slow wave line.

The optical modulator includes an optical waveguide and a differential signal path, and the optical waveguide includes a first waveguide portion extending in a first direction, a second waveguide portion extending in a second direction, and a third waveguide portion optically coupling the first waveguide portion and the second waveguide portion to each other. The differential signal path includes a first transmission line, a second transmission line, and an intersecting conductor portion. The differential signal path includes a first transmission line configured with the first signal line and the second signal line extending in the first direction at a bending portion, a second transmission line configured with the first signal line and the second signal line extending in the third direction, and an intersecting conductor portion connecting the first transmission line and the second transmission line to each other. At least one of the first transmission line and the second transmission line includes a slow wave line. When at least one of the first transmission line and the second transmission line includes the slow wave line, a velocity of the electrical signal can be reduced in the slow wave line. The slow wave line provided at the bending portion allows phase matching between the optical signal and the electrical signal at the bending portion to be performed. As a result, phase shift can be prevented from occurring at an output portion of the bending portion.

(2) In (1) above, the first transmission line may include the first signal line and the second signal line extending in the first direction and the first intersecting conductive pattern having portions extending in the third direction and overlapping with the first signal line and the second signal line in a plan view. In this case, the first transmission line has the slow wave line, and this slow wave line is configured with the first intersecting conductive pattern. Therefore, the velocity of the electrical signal can be reduced in the first transmission line corresponding to the input portion of the bending portion.

(3) In (2) above, the first transmission line may have the plurality of first intersecting conductive patterns. The plurality of first intersecting conductive patterns may be arranged at regular intervals along the first direction, and each of the first intersecting conductive patterns may be electrically floating. In this case, the plurality of electrically floating first intersecting conductive patterns are provided in the slow wave line of the first transmission line. Therefore, the velocity of the electrical signal can be more reliably reduced in the first transmission line.

(4) In any one of (1) to (3) above, the first signal line and the second signal line constituting the first transmission line may be arranged so as to interpose the first waveguide portion between the first signal line and the second signal line in a plan view.

(5) In any one of (1) to (4) above, the second transmission line may include the first signal line and the second signal line extending in the third direction and a second intersecting conductive pattern having a portion extending in the first direction and overlapping with the first signal line and the second signal line in a plan view. In this case, the second transmission line has the slow wave line, and the slow wave line is configured with the second intersecting conductive pattern. Therefore, the velocity of the electrical signal can be reduced in the second transmission line located at the bending portion.

(6) In (5) above, the second transmission line may have the plurality of second intersecting conductive patterns. The plurality of second intersecting conductive patterns may be arranged at regular intervals along the third direction, and each may be electrically floating. In this case, the plurality of electrically floating second intersecting conductive patterns are provided in the slow wave line of the second transmission line. Therefore, the velocity of the electrical signal can be more reliably reduced in the second transmission line.

(7) In any one of (1) to (6) above, the first signal line and the second signal line constituting the second transmission line may be arranged so as to interpose the third waveguide portion between the first signal line and the second signal line in a plan view.

(8) In any one of (1) to (7) above, the first signal line of the first transmission line may have a comb-shaped first comb teeth portion extending toward the second signal line of the first transmission line. The second signal line of the first transmission line may have a comb-shaped second comb teeth portion extending toward the first signal line of the first transmission line. The first transmission line may have capacitance between the first comb teeth portion and the second comb teeth portion. In this case, in the first transmission line, the first signal line has the first comb teeth portion, and the second signal line has the second comb teeth portion. Since the capacitance is formed between the first comb teeth portion and the second comb teeth portion, the velocity of the electrical signal can be reduced in the first transmission line.

(9) In (8) above, a sum of a length of the first comb teeth portion in the third direction and a length of the second comb teeth portion in the third direction may be larger than an interval of the first signal line and the second signal line in the first transmission line.

(10) In any one of (1) to (9) above, the first signal line of the second transmission line may have a comb-shaped third comb teeth portion extending toward the second signal line of the second transmission line. The second signal line of the second transmission line may have a comb-shaped fourth comb teeth portion extending toward the first signal line of the second transmission line. The second transmission line may have capacitance between the third comb teeth portion and the fourth comb teeth portion. In this case, in the second transmission line, the first signal line has the third comb teeth portion, and the second signal line has the fourth comb teeth portion. Since the capacitance is formed between the third comb teeth portion and the fourth comb teeth portion, the velocity of the electrical signal can be reduced in the second transmission line.

(11) In (10) above, a sum of a length of the third comb teeth portion in the second direction and a length of the fourth comb teeth portion in the second direction may be larger than an interval between the first signal line and the second signal line in the second transmission line.

Details of Embodiments of Present Disclosure

Examples of the optical modulators according to embodiments will be described below with reference to the drawings. It is noted that the present invention is not limited to the following examples, but is indicated in the claims, and is intended to include all changes within the scope of equivalency to the claims. In the description of the drawings, the same or corresponding elements are denoted by the same reference numerals, and redundant description will be omitted as appropriate. For ease of understanding, some portions of the drawings may be simplified or exaggerated, and the dimensional ratios and the like are not limited to those illustrated in the drawings.

FIG. 1 is a plan view illustrating an optical modulator 1 according to the embodiment. The optical modulator 1 is a Mach-Zehnder modulator. The optical modulator 1 includes an optical waveguide 10 and a differential signal path 20. The optical waveguide 10 includes a first waveguide portion 11 extending in a first direction D1, a second waveguide portion 12 extending in a second direction D2 being a direction different from the first direction D1, and a third waveguide portion 13 that is bent so as to optically couple the first waveguide portion 11 to the second waveguide portion 12. The third waveguide portion 13 has a U-shape. The optical modulator 1 includes a bending portion P formed in a region including the third waveguide portion 13 and a modulator portion M.

The first waveguide portion 11 extends linearly along the first direction D1, and the second waveguide portion 12 extends linearly along the second direction D2. In the first waveguide portion 11, an optical signal travels in the first direction D1. In the second waveguide portion 12, an optical signal travels in the second direction D2. The second direction D2 is, for example, an opposite direction to the first direction D1. That is, in this embodiment, an angle formed by the first direction D1 and the second direction D2 is 180 degrees. However, the angle formed by the first direction D1 and the second direction D2 may be 180 degrees or less, for example, 45 degrees, 90 degrees, 120 degrees, or 150 degrees, and is not particularly limited. The bending portion P is configured according to the angle formed by the first direction D1 and the second direction D2. For example, when the angle is 90 degrees, the third waveguide portion 13 does not have a U-shape but has a shape bent by 90 degrees.

The third waveguide portion 13 is a portion optically coupling the first waveguide portion 11 and the second waveguide portion 12 to each other. The third waveguide portion 13 includes, for example, a first portion 13*b* extending in the third direction D3 intersecting both the first direction D1 and the second direction D2, a second portion 13*c* extending from the first waveguide portion 11 to the first portion 13*b*, and a third portion 13*d* extending from the first portion 13*b* to the second waveguide portion 12. The first portion 13*b* extends linearly, and each of the second portion 13*c* and the third portion 13*d* extends in a curved shape. For example, each of the second portion 13*c* and the third portion 13*d* has an arc shape. Each of the second portion 13*c* and the third portion 13*d* may have a monotonically curved shape. It is noted that the first portion 13*b* may be omitted. For example, when the angle formed by the first direction D1 and the second direction D2 is 90 degrees or less, the second portion 13*c* and the third portion 13*d* may be directly connected to each other.

For example, the optical waveguide 10 includes a first arm waveguide 10A and a second arm waveguide 10B. Each of the first arm waveguide 10A and the second arm waveguide 10B has the first waveguide portion 11, the second waveguide portion 12, and the third waveguide portion 13. The first arm waveguide 10A extends outside the second arm waveguide 10B. More specifically, when viewed along a fourth direction D4 intersecting the first direction D1, the second direction D2, and the third direction D3 (for example, in a plan view), the third waveguide portion 13 of the first arm waveguide 10A is bent on the outside of the third waveguide portion 13 of the second arm waveguide 10B. The fourth direction D4 may be a direction perpendicular to an upper plane of the substrate SUB.

The optical modulator 1 includes a first optical coupler 14 and a second optical coupler 15. The first optical coupler 14 and the second optical coupler 15 are, for example, multimode interferometers. Each of the first waveguide portion 11 of the first arm waveguide 10A and the first waveguide portion 11 of the second arm waveguide 10B is connected to the first optical coupler 14. Each of the second waveguide portion 12 of the first arm waveguide 10A and the second waveguide portion 12 of the second arm waveguide 10B is connected to the second optical coupler 15. The first optical coupler 14 receives an input light beam from an outside of the optical modulator 1. The propagation direction of the light beam (optical signal) propagating from the first optical coupler 14 to the first waveguide portion 11 is changed in the third waveguide portion 13 bending. The light beam of which propagation direction is changed in the third waveguide portion 13 propagates to the second waveguide portion 12 and the second optical coupler 15. The light beam propagated to the second optical coupler 15 is output to the outside of the optical modulator 1 as an output light beam. The first direction D1 is a direction in which an optical signal in the first waveguide portion 11 travels from the first optical coupler 14 toward the bending portion P. The third direction D3 is a direction in which an optical signal in the third waveguide portion 13 travels from the first waveguide portion 11 toward the second waveguide portion 12. The second direction D2 is a direction in which an optical signal in the second waveguide portion 12 travels from the bending portion P toward the second optical coupler 15.

The optical modulator 1 has, for example, the traveling wave type differential signal path 20. The differential signal path 20 includes a first signal line 21, a second signal line 22, and a reference potential line 23. For example, the first signal line 21, the second signal line 22, and the reference potential line 23 are made of metal. Each of the first signal line 21 and the second signal line 22 transmits an electrical signal (sometimes, referred to as a drive signal of an optical modulator) applied to the first arm waveguide 10A and the second arm waveguide 10B. The reference potential line 23 provides a reference electrical plane for the differential signal path 20. The first signal line 21 includes, for example, a first conductor portion 21*b*, a second conductor portion 21*c*, and a first intersecting conductor portion 21*d* (intersecting conductor portion). The first conductor portion 21*b* extends in the first direction D1 and is connected to the first waveguide portion 11 of the first arm waveguide 10A. The second conductor portion 21*c* extends in the second direction D2 and is connected to the second waveguide portion 12 of the first arm waveguide 10A. The first intersecting conductor portion 21*d* connects the second conductor portion 21*c* to the first conductor portion 21*b*.

The second signal line 22 includes a first conductor portion 22*b*, a second conductor portion 22*c*, and a second intersecting conductor portion 22*d* (intersecting conductor portion). The first conductor portion 22*b* extends in the first direction D1 along the first waveguide portion 11 of the second arm waveguide 10B and is connected to the first waveguide portion 11 of the second arm waveguide 10B. The second conductor portion 22*c* extends in the second direction D2 along the second waveguide portion 12 of the second arm waveguide 10B and is connected to the second waveguide portion 12 of the second arm waveguide 10B. The second intersecting conductor portion 22*d* connects the second conductor portion 22*c* to the first conductor portion 22*b*. The first intersecting conductor portion 21*d* of the first signal line 21 and the second intersecting conductor portion 22*d* of the second signal line 22 have portions that are spaced apart from each other in the fourth direction D4, and in the portion, the first signal line 21 and the second signal line 22 intersect each other three-dimensionally. In other words, the first intersecting conductor portion 21*d* of the first signal line 21 and the second intersecting conductor portion 22*d* of the second signal line 22 form a grade separation of wiring.

In the optical modulator 1, the first arm waveguide 10A and the second arm waveguide 10B are bent so as to optically couple each of the first waveguide portion 11 of the first arm waveguide 10A and the first waveguide portion 11 of the second arm waveguide 10B to the respective second waveguide portion 12 of the first arm waveguide 10A and the respective second waveguide portion 12 of the second arm waveguide 10B. The first signal line 21 and the second signal line 22 connected to the respective first waveguide portion 11 of the first arm waveguide 10A and the respective first waveguide portion 11 of the second arm waveguide 10B intersect with each other three-dimensionally in the first intersecting conductor portion 21*d* and the second intersecting conductor portion 22*d*. Due to the intersection of the first signal line 21 and the second signal line 22, the first signal line 21 and the second signal line 22 can be routed independently of the arrangement of the outer circumference and of the arrangement of the inner circumference in the routing of the first arm waveguide 10A and the second arm waveguide 10B. With this independent routing, a skew that occurs between the electrical signal propagating on the first signal line 21 and the electrical signal propagating on the second signal line 22 due to the outer circumferences and the inner circumferences of the first arm waveguide 10A and the second arm waveguide 10B can be reduced.

The reference potential line 23 includes a first conductor portion 23*b*, a second conductor portion 23*c*, and an intersecting conductor portion 23*d*. The first conductor portion 23*b* is located between the first conductor portion 21*b* of the first signal line 21 and the first conductor portion 22*b* of the second signal line 22 in the third direction D3. The intersecting conductor portion 23*d* intersects each of the first intersecting conductor portion 21*d* of the first signal line 21 and the second intersecting conductor portion 22*d* of the second signal line 22 in three dimensions.

In the first signal line 21, the second conductor portion 21*c* is connected to the second waveguide portion 12 of the first arm waveguide 10A. The second conductor portion 21*c* extends in the second direction D2 along the second waveguide portion 12 of the first arm waveguide 10A. In the second signal line 22, the second conductor portion 22*c* is connected to the second waveguide portion 12 of the second arm waveguide 10B. The second conductor portion 22*c* extends in the second direction D2 along the second waveguide portion 12 of the second arm waveguide 10B.

Figure 2:
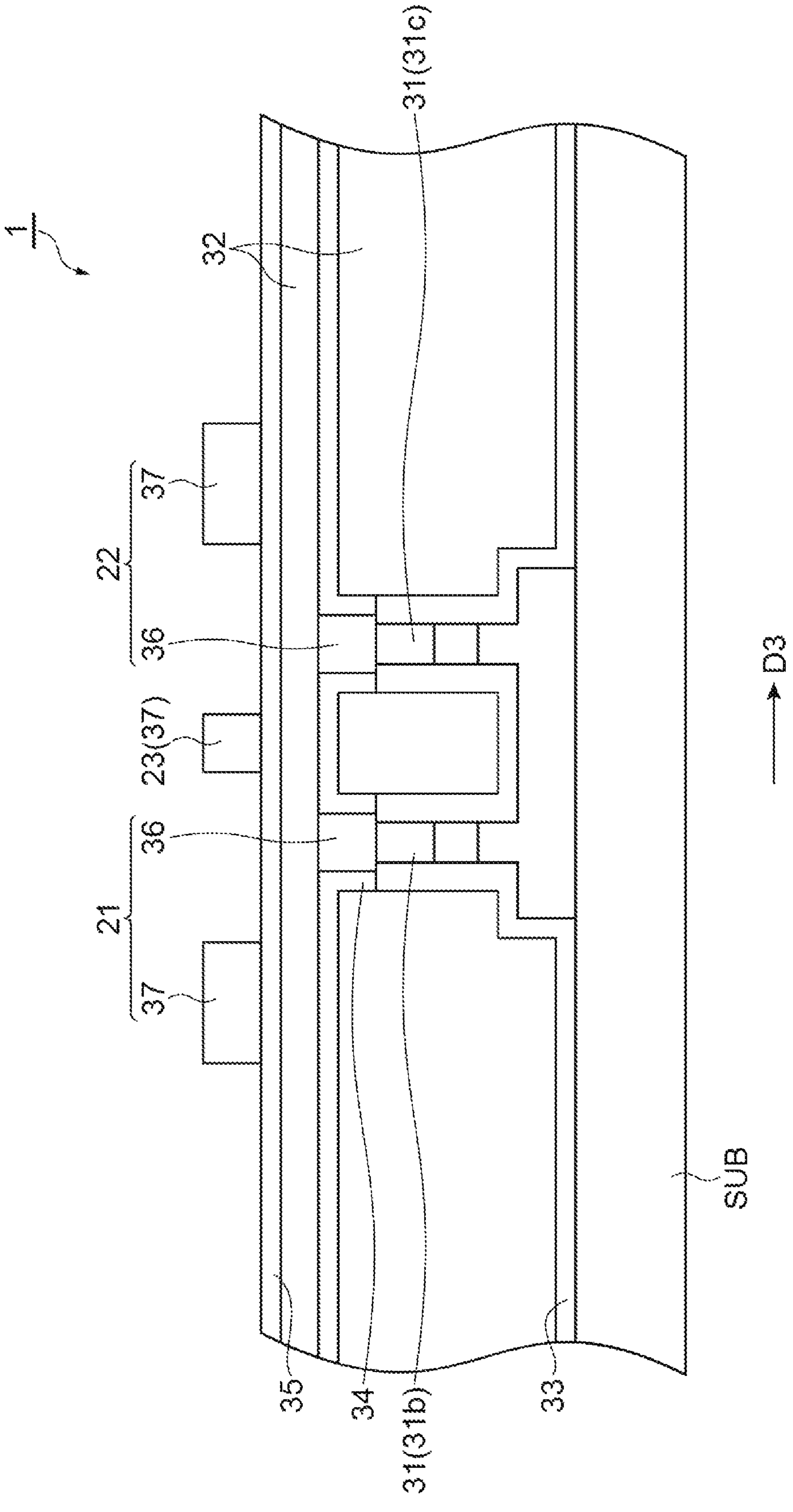
FIG. 2 is a cross-sectional view taken along line A-A in FIG. 1.

FIG. 2 is a cross-sectional view taken along line A-A in FIG. 1. As illustrated in FIG. 2, in the optical modulator 1, a semiconductor mesa 31 is embedded in an insulator, and this insulator includes a resin body 32 and silicon-based inorganic insulation films 33, 34, and 35. A lower conductor layer 36 extends over the semiconductor mesa 31 that is embedded with an insulator. The lower conductor layer 36 is in contact with an upper surface of the semiconductor mesa 31. An upper conductor layer 37 extends on the insulator separately from the lower conductor layer 36. The semiconductor mesa 31 includes a first semiconductor mesa 31*b* and a second semiconductor mesa 31*c* arranged along the third direction D3. The lower conductor layer 36 and the upper conductor layer 37 located above the first semiconductor mesa 31*b* constitute the first signal line 21. The lower conductor layer 36 and the upper conductor layer 37 located above the second semiconductor mesa 31*c* constitute the second signal line 22. The reference potential line 23 made of the upper conductor layer 37 is formed between the first signal line 21 and the second signal line 22. The optical modulator 1 is formed on a substrate SUB. More specifically, the optical modulator 1 is formed on the upper plane of the substrate SUB.

Figure 3:
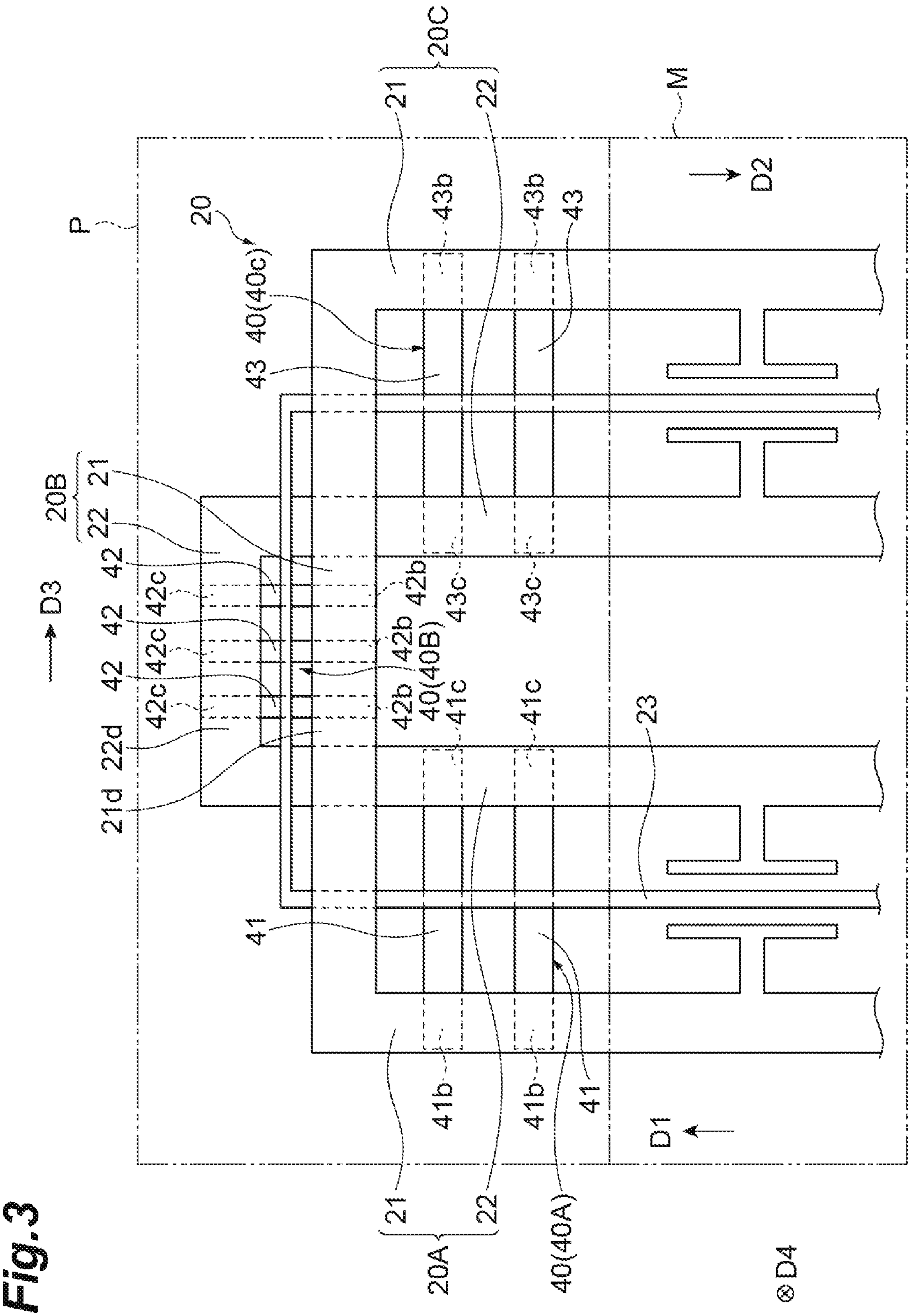
FIG. 3 is a plan view illustrating the differential signal path of FIG. 1.

FIG. 3 is a plan view illustrating the differential signal path 20 of the optical modulator 1. As illustrated in FIG. 3, the differential signal path 20 includes a first transmission line 20A configured with the first signal line 21 and the second signal line 22, each extending in the first direction D1, at the bending portion P and a second transmission line 20B configured with the first signal line 21 and the second signal line 22, each extending in the third direction D3. The second transmission line 20B has the same characteristic impedance as the characteristic impedance of the differential signal path 20 of the modulator portion M and has the propagation velocity higher than the propagation velocity of the differential signal path 20 of the modulator portion M. Furthermore, the differential signal path 20 includes the third transmission line 20C configured with the first signal line 21 and the second signal line 22, each extending in the second direction D2. Each of the first intersecting conductor portion 21*d* and the second intersecting conductor portion 22*d* connects the first transmission line 20A and the second transmission line 20B to each other and connects the second transmission line 20B and the third transmission line 20C to each other.

The differential signal path 20 has a slow wave line 40. The "slow wave line" is a transmission line that has a configuration in which the capacitance increases when expressed as a distributed constant circuit of an inductor and a capacitor (capacitance), among transmission lines that constitutes the differential signal path. For example, the differential signal path 20 includes the plurality of slow wave lines 40. The plurality of slow wave lines 40 includes a first slow wave line 40A formed on the first transmission line 20A, a second slow wave line 40B formed on the second transmission line 20B, and a third slow wave line 40C formed on the third transmission line 20C.

The first transmission line 20A includes the first signal line 21 and the second signal line 22, each extending in the first direction D1, and a first lower layer conductor 41 having portions 41*b* and 41*c* extending in the third direction D3 and overlapping with the first signal line 21 and the second signal line 22 in a plan view along the fourth direction D4. The first signal line 21 and the second signal line 22 constituting the first transmission line 20A are arranged so as to interpose the first waveguide portion 11 of the optical waveguide 10 between the first signal line 21 and the second signal line 22 in a plan view. The first slow wave line 40A is configured with the first lower layer conductor 41. The first lower layer conductor 41 is electrically floating. The first lower layer conductor 41 may be configured with, for example, the lower conductor layer 36. The first lower layer conductor 41 is, for example, made of metal. The first lower layer conductor 41 is an example of the first intersecting conductive pattern.

The portion 41*b* of the first lower layer conductor 41 overlapping with the first signal line 21 in a plan view is located at the end of the first lower layer conductor 41 in the opposite direction (or outside) to the third direction D3. The portion 41*c* of the first lower layer conductor 41 overlapping with the second signal line 22 in a plan view is located at the end of the first lower layer conductor 41 in the third direction D3 (or inside). The width of the first lower layer conductor 41 (the length in the first direction D1) is, for example, smaller than the width of the first signal line 21 (the length in the third direction D3), and smaller than the width of the second signal line 22 (the length in the third direction D3). The first transmission line 20A has the plurality of first lower layer conductors 41, and the plurality of first lower layer conductors 41 are arranged at regular intervals along the first direction D1. As an example, the number of first lower layer conductors 41 is two. However, the number of first lower layer conductors 41 is not particularly limited.

The second transmission line 20B includes the first signal line 21 and the second signal line 22, each extending in the third direction D3 and a second lower layer conductor 42 having portions 42*b* and 42*c* extending in the first direction D1 and overlapping with the first signal line 21 and the second signal line 22 in a plan view. The first signal line 21 and the second signal line 22 constituting the second transmission line 20B are arranged so as to interpose the third waveguide portion 13 of the optical waveguide 10 between the first signal line 21 and the second signal line 22 in a plan view. The second slow wave line 40B is configured with the second lower layer conductor 42. The second lower layer conductor 42 is electrically floating. The second lower layer conductor 42 may be configured with, for example, the lower conductor layer 36. The second lower layer conductor 42 is, for example, made of metal. The second lower layer conductor 42 is an example of the second intersecting conductive pattern. It is noted that, since the second transmission line 20B is not connected to the third waveguide portion 13, it does not need to be arranged to interpose the third waveguide portion 13. For example, the third waveguide portion 13 may be arranged between the second transmission line 20B and the modulator portion M. Alternatively, the second transmission line 20B may be arranged between the third waveguide portion 13 and the modulator portion M. In this manner, a phase difference between the electrical signal and the optical signal at the bending portion P can be adjusted by adjusting a positional relationship between the third waveguide portion 13 and the second transmission line 20B in the first direction D1 (or the second direction D2).

The portion 42*b* of the second lower layer conductor 42 overlapping with the first signal line 21 in a plan view is located at the end of the second lower layer conductor 42 in the opposite direction (or inside) to the first direction D1. The portion 42*c* of the second lower layer conductor 42 overlapping with the second signal line 22 in a plan view is located at the end of the second lower layer conductor 42 in the first direction D1 (or outside). The width of the second lower layer conductor 42 (the length in the third direction D3) is, for example, smaller than the width of the first signal line 21 (the length in the first direction D1) and smaller than the width of the second signal line 22 (the length in the first direction D1). The width of the second lower layer conductor 42 is, for example, smaller than the width of the first lower layer conductor 41. The second transmission line 20B has the plurality of second lower layer conductors 42, and the plurality of second lower layer conductors 42 are arranged at regular intervals along the third direction D3. As an example, the number of second lower layer conductors 42 is three. However, the number of second lower layer conductors 42 is not particularly limited.

The third transmission line 20C includes the first signal line 21 and the second signal line 22, each extending in the second direction D2, and the third lower layer conductor 43 having portions 43*b* and 43*c* extending in the third direction D3 and overlapping with the first signal line 21 and the second signal line 22 in a plan view. The first signal line 21 and the second signal line 22 constituting the third transmission line 20C are arranged so as to interpose the second waveguide portion 12 of the optical waveguide 10 between the first signal line 21 and the second signal line 22 in a plan view. The third slow wave line 40C is configured with the third lower layer conductor 43. The third lower layer conductor 43 is electrically floating. The third lower layer conductor 43 may be configured with, for example, the lower conductor layer 36.

The portion 43*b* of the third lower layer conductor 43 overlapping with the first signal line 21 in a plan view is located at the end of the third lower layer conductor 43 in the third direction D3 (or outside). The portion 43*c* of the third lower layer conductor 43 overlapping with the second signal line 22 in a plan view is located at the end of the third lower layer conductor 43 in the opposite direction (or inside) to the third direction D3. The width of the third lower layer conductor 43 (the length in the second direction D2) is, for example, smaller than the width of the first signal line 21 (the length in the third direction D3), and smaller than the width of the second signal line 22 (the length in the third direction D3). For example, the width of the third lower layer conductor 43 is the same as the width of the first lower layer conductor 41. The third transmission line 20C has the plurality of third lower layer conductors 43, and the plurality of third lower layer conductors 43 are arranged at regular intervals along the second direction D2. As an example, the number of third lower layer conductors 43 is two. However, the number of third lower layer conductors 43 is not particularly limited.

Figure 4:
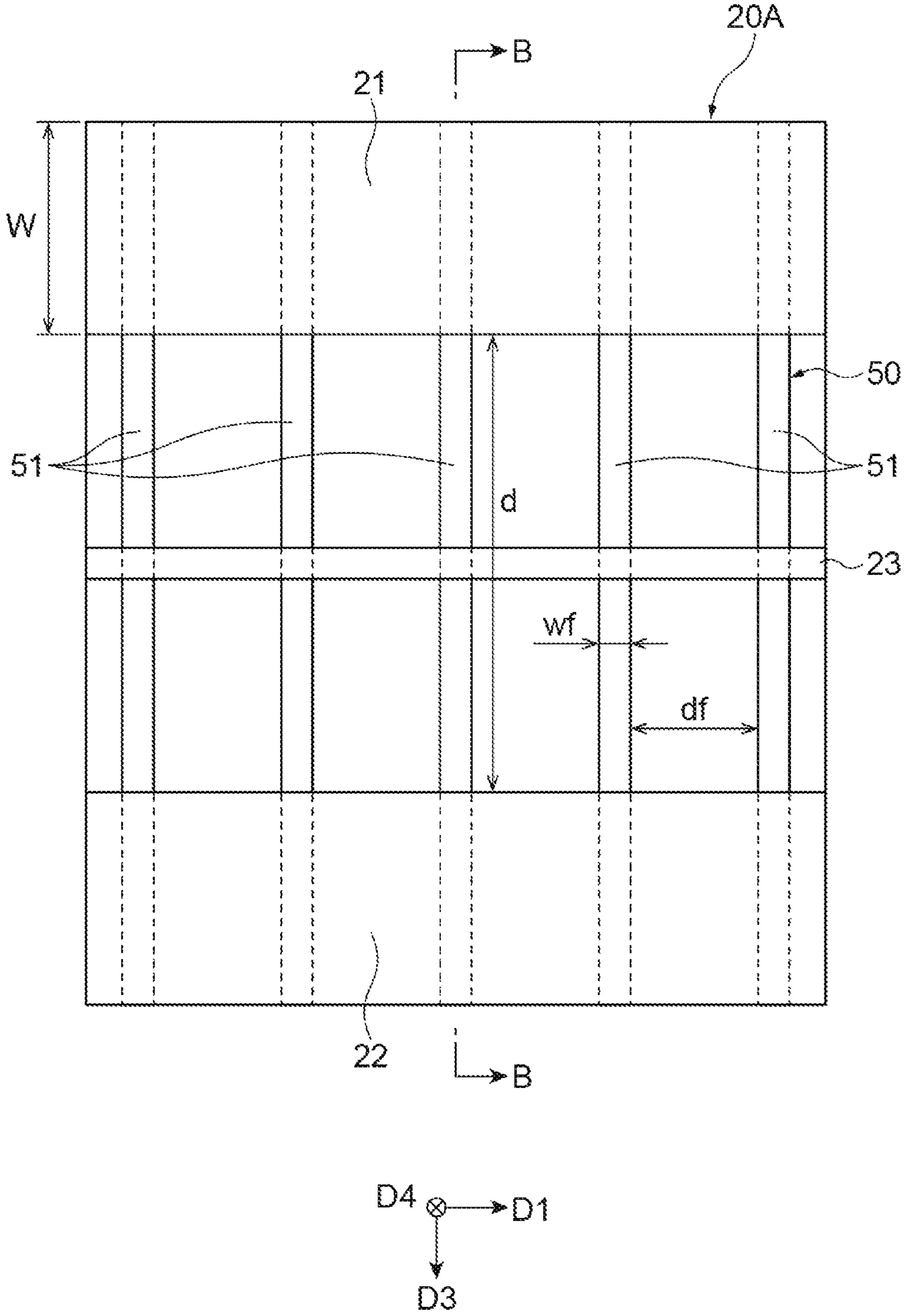
FIG. 4 is a plan view illustrating an example of a slow wave line.
Figure 5:
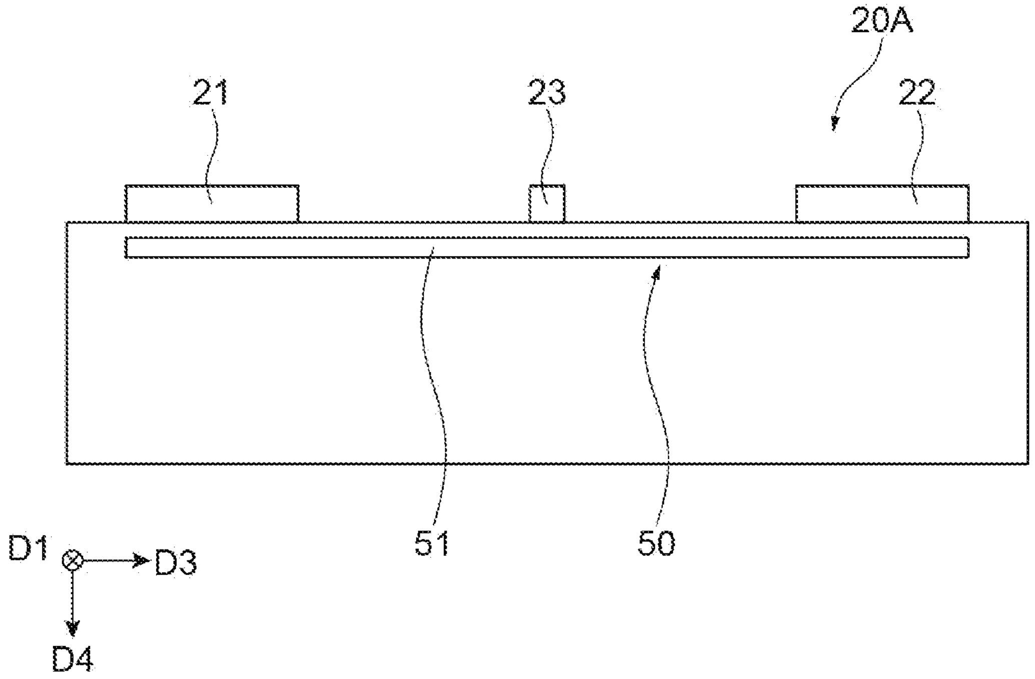
FIG. 5 is a cross-sectional view taken along line B-B in FIG. 4.

FIG. 4 is a plan view illustrating the slow wave line 50 according to Modified Example. FIG. 5 is a cross-sectional view taken along line B-B in FIG. 4. The slow wave line 50 is provided in place of the first slow wave line 40A in the first transmission line 20A. However, the slow wave line 50 may be provided in place of the second slow wave line 40B in the second transmission line 20B and may be provided in place of the third slow wave line 40C in the third transmission line 20C. The slow wave line 50 has five lower layer conductors 51 extending from the first signal line 21 to the second signal line 22. The lower layer conductor 51 is spaced apart from the first signal line 21 and the second signal line 22 in the fourth direction D4. More specifically, the lower layer conductor 51 is located below the first signal line 21 and the second signal line 22 in the cross section along the plane perpendicular to the direction (for example, the first direction D1) in which the first signal line 21 and the second signal line 22 extend. Therefore, the lower layer conductor 51 is located between the first signal line 21 and the second signal line 22 and the substrate SUB in the fourth direction D4. The lower layer conductor 51 is electrically floating like the first lower layer conductor 41 and the like described above. The lower layer conductor 51 may be configured with, for example, the lower conductor layer 36.

The relationship between characteristic impedance $Z_0$ in the slow wave line 50 and a propagation velocity $v_p$, that is a velocity of the electrical signal, will be described. First, the characteristic impedance $Z_0$ is obtained from the following equation (1).

[Equation 1]

$$Z_0 = \sqrt{\frac{R + j\omega L}{G + j\omega C}} \quad (1)$$

R is resistance, L is inductance, G is conductance, and C is capacitance, each representing a value per unit length of the transmission line. Then, the propagation constant $\gamma$ is obtained from the following equation (2).

[Equation 2]

$$\gamma = \sqrt{(R + j\omega L)(G + j\omega C)} = \alpha + j\beta \quad (2)$$

$\alpha$ is an attenuation constant, and $\beta$ is a phase constant. The propagation velocity $v_p$ is obtained from the following equation (3).

[Equation 3]

$$v_p = \frac{\omega}{\beta} \quad (3)$$

Herein, when R and G are sufficiently small ($R \ll j\omega L$ and $G \ll j\omega C$), the characteristic impedance $Z_0$ and the propagation velocity $v_p$ are obtained from the following equations (4) and (5). For example, when a frequency f of the electrical signal becomes 10 GHz or more, an angular frequency $\omega = 2\pi f$ becomes sufficiently large and can be handled by equations (4) and (5).

[Equation 4]

$$Z_0 = \sqrt{\frac{L}{C}} \quad (4)$$

[Equation 5]

$$v_p = \frac{1}{\sqrt{LC}} \quad (5)$$

As illustrated in equations (4) and (5), both the characteristic impedance $Z_0$ and the propagation velocity $v_p$ depend on the inductance L and the capacitance C, and are determined by a shape of the transmission line. The slow wave line 50 has a structure having a strip-shaped lower layer conductor 51 in the lower layer. Accordingly, each of the characteristic impedance $Z_0$ and the propagation velocity $v_p$ can be controlled independently. For example, the capacitance C can be increased by increasing a conductive pattern density by narrowing the interval of the lower layer conductors 51 or by increasing a signal line width W of the first signal line 21. Further, L can be increased by increasing an interval d between the first signal line 21 and the second signal line 22. According to equations (4) and (5), by increasing both L and C while maintaining an L/C (ratio of L and C) constant, the characteristic impedance $Z_0$ is allowed to be constant, and the propagation velocity $v_p$ can be reduced. Since each of the characteristic impedance $Z_0$ and the propagation velocity $v_p$ can be controlled independently by providing the slow wave line 50, both matching of the characteristic impedance $Z_0$ and matching of the propagation velocity $v_p$ can be achieved.

In the slow wave line 50, the capacitance is added between the first signal line 21 and the second signal line 22 via the lower layer conductor 51 by arranging the lower layer conductor 51, and the capacitance can be increased between the first signal line 21 and the second signal line 22. Hereinafter, a simulation of the relationship between the characteristic impedance $Z_0$ and the propagation velocity $v_p$ in the first signal line 21 and the second signal line 22 having the slow wave line 50 (hereinafter referred to as an example) and the first signal line 21 and the second signal line 22 not having the slow wave line 50 (hereinafter referred to as Comparative Example) will be described. In this simulation, it is assumed that the length of the first signal line 21 and the length of the second signal line 22 are 200 μm, the interval d between the first signal line 21 and the second signal line 22 is 100 μm, the signal line width W is 40 μm, the width wf of the lower layer conductor 51 is 5 μm, and the interval df between two adjacent lower layer conductors 51 is 29 μm. The results of this simulation are illustrated in Table 1 below.

TABLE 1

| | Example | Comparative Example |
|---|---|---|
| Inductance L | 129.83 pH | 84.22 pH |
| Capacitance C | 12.92 fF | 8.47 fF |
| Impedance $Z_0$ | 100.26 ohm | 99.74 ohm |
| Delay time | 2.14 ps | 1.38 ps |
| Propagation velocity vp | $9.36 \times 10^7$ m/s | $1.44 \times 10^8$ m/s |

In the case of the embodiment having the slow wave line 50, the inductance L and capacitance C can be increased at the same ratio by increasing the interval d between the first signal line 21 and the second signal line 22. Therefore, it can be understood that a delay time can be increased by about 1.5 times from 1.38 ps to 2.14 ps while maintaining the impedance $Z_0$ at about 100Ω. It can be understood that the propagation velocity $v_p$ can be reduced to 1/1.5 times.

Next, the functions and effects obtained from the optical modulator 1 according to this embodiment will be described. The optical modulator 1 includes an optical waveguide 10 and a differential signal path 20, and the optical waveguide 10 includes a first waveguide portion 11 extending in a first direction D1, a second waveguide portion 12 extending in a second direction D2, and a third waveguide portion 13 that optically couples the first waveguide portion 11 and the second waveguide portion 12 to each other. The differential signal path 20 includes the first transmission line 20A, the second transmission line 20B, and the intersecting conductor portion (the first intersecting conductor portion 21*d* and the second intersecting conductor portion 22*d*). The differential signal path 20 includes the first transmission line 20A configured with the first signal line 21 and the second signal line 22 extending in the first direction D1 at the bending portion P, the second transmission line 20B configured with the first signal line 21 and the second signal line 22 extending in the third direction D3, and the intersecting conductor portion connecting the first transmission line 20A and the second transmission line 20B to each other. The first transmission line 20A and the second transmission line 20B include the slow wave line 40. Since the first transmission line 20A and the second transmission line 20B include the slow wave line 40, the velocity of the electrical signal can be reduced in the slow wave line 40. The phase matching between the optical signal and the electrical signal at the bending portion P can be performed by the slow wave line 40 provided at the bending portion P. As a result, the phase shift can be prevented from occurring at the output portion of the bending portion P.

In the present embodiment, the first transmission line 20A may include the first signal line 21 and the second signal line 22 extending in the first direction D1 and the first lower layer conductor 41 having portions 41*b* and 41*c* extending in the third direction D3 and overlapping with the first signal line 21 and the second signal line 22 in a plan view. In this case, the first transmission line 20A has the first slow wave line 40A, and the first slow wave line 40A is configured with the first lower layer conductor 41. Therefore, the velocity of the electrical signal can be reduced in the first transmission line 20A corresponding to the input portion at the bending portion P.

The above-described input portion indicates the portion where the optical signal and the electrical signal enter into the bending portion P. On the other hand, the output portion indicates the portion where the optical signal and the electrical signal are emitted from the bending portion P. If the propagation time is a time taken to propagate from the input portion to the output portion, the propagation time the of the electrical signal is set to be equal to the propagation time to of the optical signal. That is, the propagation velocity vp1 of the electrical signal in the first transmission line 20A, the propagation velocity vp2 of the electrical signal in the second transmission line 20B, and the propagation velocity vp3 of the electrical signal in the third transmission line 20C are set to be equal to the propagation time to of the optical signal. More specifically, when the length of the first transmission line 20A is assumed to be Le1, the length of the second transmission line 20B is assumed to be Le2, and the length of the third transmission line 20C is assumed to be Le3, the propagation velocities vp1, vp2, and vp3 are set so as to satisfy the following relationship.

$$te = (Le1/vp1) + (Le2/vp2) + (Le3/vp3) = to$$

Herein, “equal” may denote different values within a practically acceptable range. The acceptable range is, for example, a relative error of 5% or less.

In this embodiment, the first transmission line 20A may include the plurality of first lower layer conductors 41. The plurality of first lower layer conductors 41 are arranged at regular intervals along the first direction D1, and each of the first lower layer conductors 41 may be electrically floating. In this case, the plurality of electrically floating first lower layer conductors 41 are provided in the first slow wave line 40A of the first transmission line 20A. Therefore, the velocity of the electrical signal in the first transmission line 20A can be more reliably reduced.

In the present embodiment, the second transmission line 20B may include the first signal line 21 and the second signal line 22 extending in the third direction D3 and the second lower layer conductor 42 having portions 42*b* and 42*c* extending in the first direction D1 and overlapping with the first signal line 21 and the second signal line 22 in a plan view. In this case, the second transmission line 20B has the second slow wave line 40B, and the second slow wave line 40B is configured with the second lower layer conductor 42. Therefore, the velocity of the electrical signal can be reduced in the second transmission line 20B located at the bending portion P.

In this embodiment, the second transmission line 20B may have the plurality of second lower layer conductors 42. The plurality of second lower layer conductors 42 are arranged at regular intervals along the third direction D3, and each of the second lower layer conductors 42 may be electrically floating. In this case, the plurality of electrically floating second lower layer conductors 42 are provided in the second slow wave line 40B of the second transmission line 20B. Therefore, the velocity of the electrical signal can be more reliably reduced in the second transmission line 20B.

Figure 6:
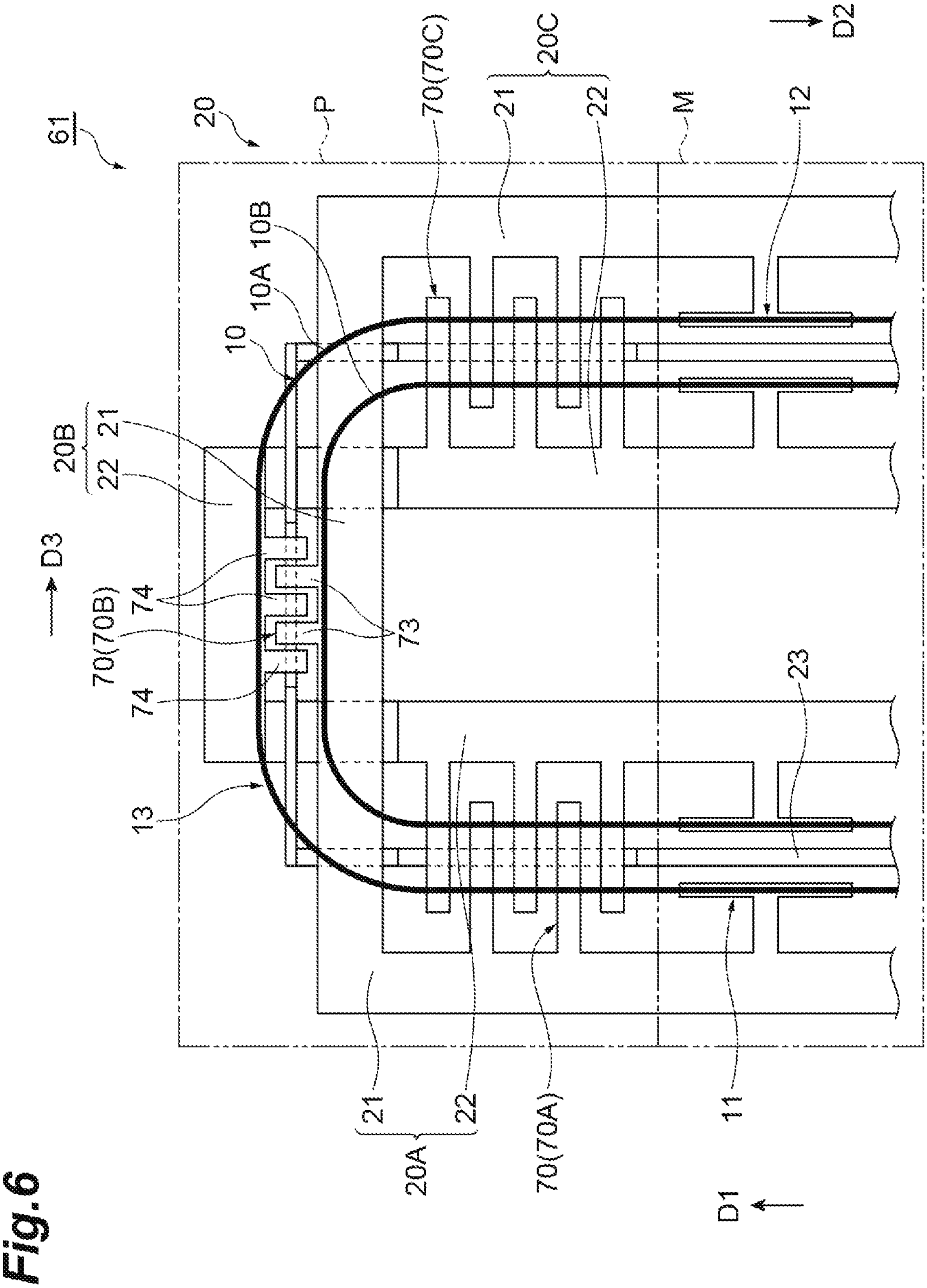
FIG. 6 is a plan view illustrating an optical waveguide and a differential signal path of an optical modulator according to Modified Example.

Next, an optical modulator 61 according to Modified Example will be described with reference to FIG. 6. A portion of the configuration of the optical modulator 61 is the same as a portion of the configuration of the optical modulator 1 described above. Therefore, in the following, the same description as those previous description will be denoted by the same reference numerals and omitted as appropriate. The optical modulator 61 has a slow wave line 70 different from the slow wave line 40 and the slow wave line 50 described above. For example, the differential signal path 20 includes the plurality of slow wave lines 70. The plurality of slow wave lines 70 include a first slow wave line 70A formed on the first transmission line 20A, a second slow wave line 70B formed on the second transmission line 20B, and a third slow wave line 70C formed on the third transmission line 20C.

Figure 7:
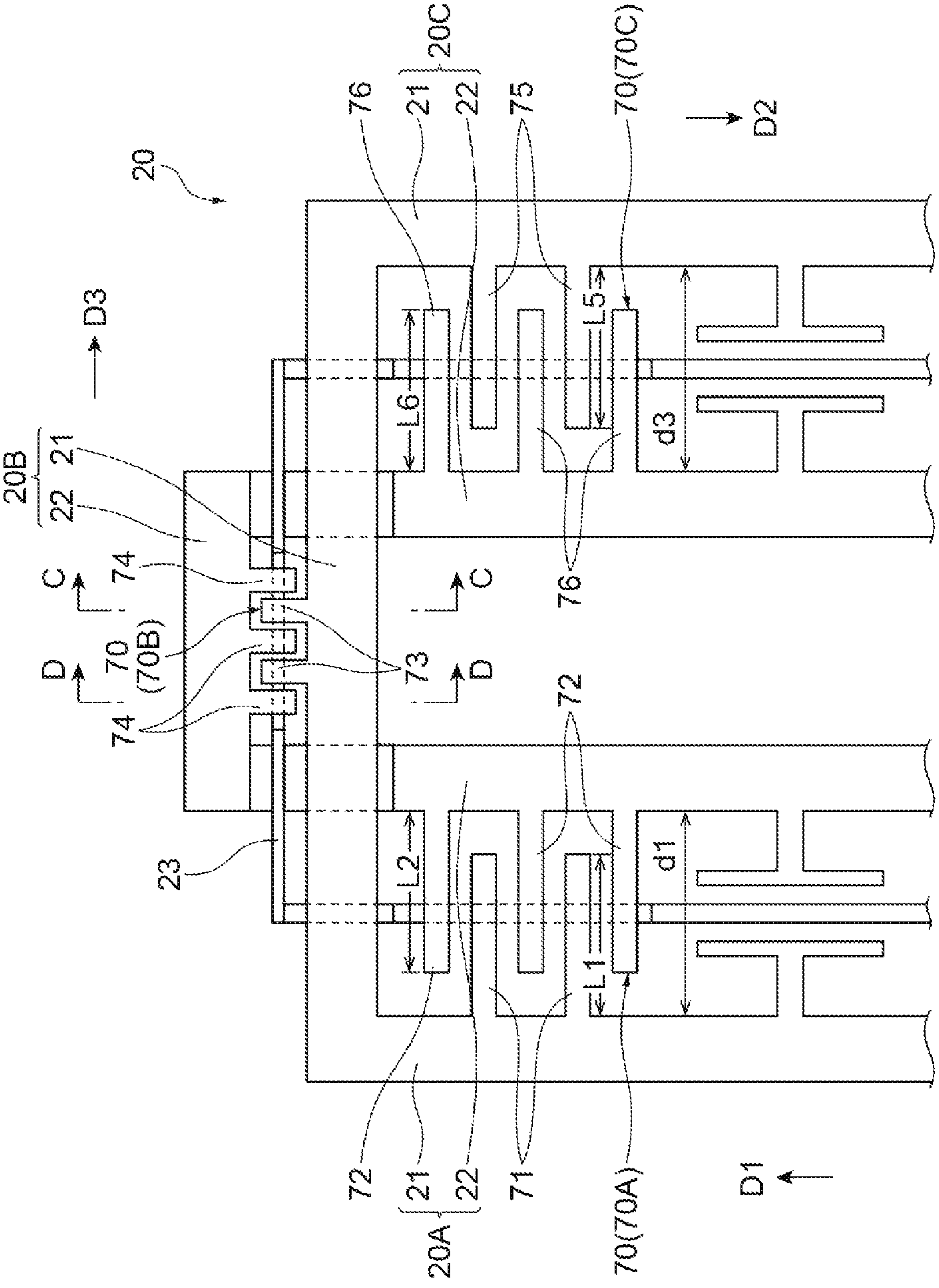
FIG. 7 is a plan view illustrating a differential signal path of FIG. 6.

FIG. 7 is a plan view illustrating the differential signal path 20 of the optical modulator 61. The first signal line 21 of the first transmission line 20A has a comb-shaped first comb teeth portion 71 extending toward the second signal line 22 of the first transmission line 20A. The first slow wave line 70A has the plurality of first comb teeth portions 71, and the plurality of first comb teeth portions 71 are aligned along the first direction D1. A width of the first comb teeth portion 71 (a length in the first direction D1) is, for example, smaller than the width of the first signal line 21 (the length in the third direction D3) and the width of the second signal line 22 (the length in the third direction D3). As an example, the number of first comb teeth portions 71 is two. However, the number of first comb teeth portions 71 is not particularly limited.

The second signal line 22 of the first transmission line 20A has a comb-shaped second comb teeth portion 72 extending toward the first signal line 21 of the first transmission line 20A. The first transmission line 20A has capacitance between the first comb teeth portion 71 and the second comb teeth portion 72. The first comb teeth portion 71 and the second comb teeth portion 72 constitute the first slow wave line 70A. A sum of a length L1 of the first comb teeth portion 71 in the third direction D3 and a length L2 of the second comb teeth portion 72 in the third direction D3 is larger than an interval d1 between the first signal line 21 and the second signal line 22 in the first transmission line 20A. The length L2 of the second comb teeth portion 72 in the third direction D3 may be equal to the length L1 of the first comb teeth portion 71 in the third direction D3.

The first slow wave line 70A has the plurality of second comb teeth portions 72, and the plurality of second comb teeth portions 72 are aligned along the first direction D1. The first comb teeth portions 71 and the second comb teeth portions 72 are aligned alternately along the first direction D1. The width of the second comb teeth portion 72 (the length in the first direction D1) is, for example, smaller than the width of the first signal line 21 and the width of the second signal line 22. As an example, the number of second comb teeth portions 72 is three. However, the number of second comb teeth portions 72 is not particularly limited. The first slow wave line 40A, for example, uses the lower conductor layer 36 to constitute the first lower layer conductor 41. On the other hand, since the first comb teeth portion 71 and the second comb teeth portion 72 are configured with the same upper conductor layer 37 as the first signal line 21 and the second signal line 22, the first slow wave line 70A can be configured with more easily than the first slow wave line 40A. Similarly, the second slow wave line 70B and the third slow wave line 70C can also be configured with only the upper conductor layer 37.

Figure 8:
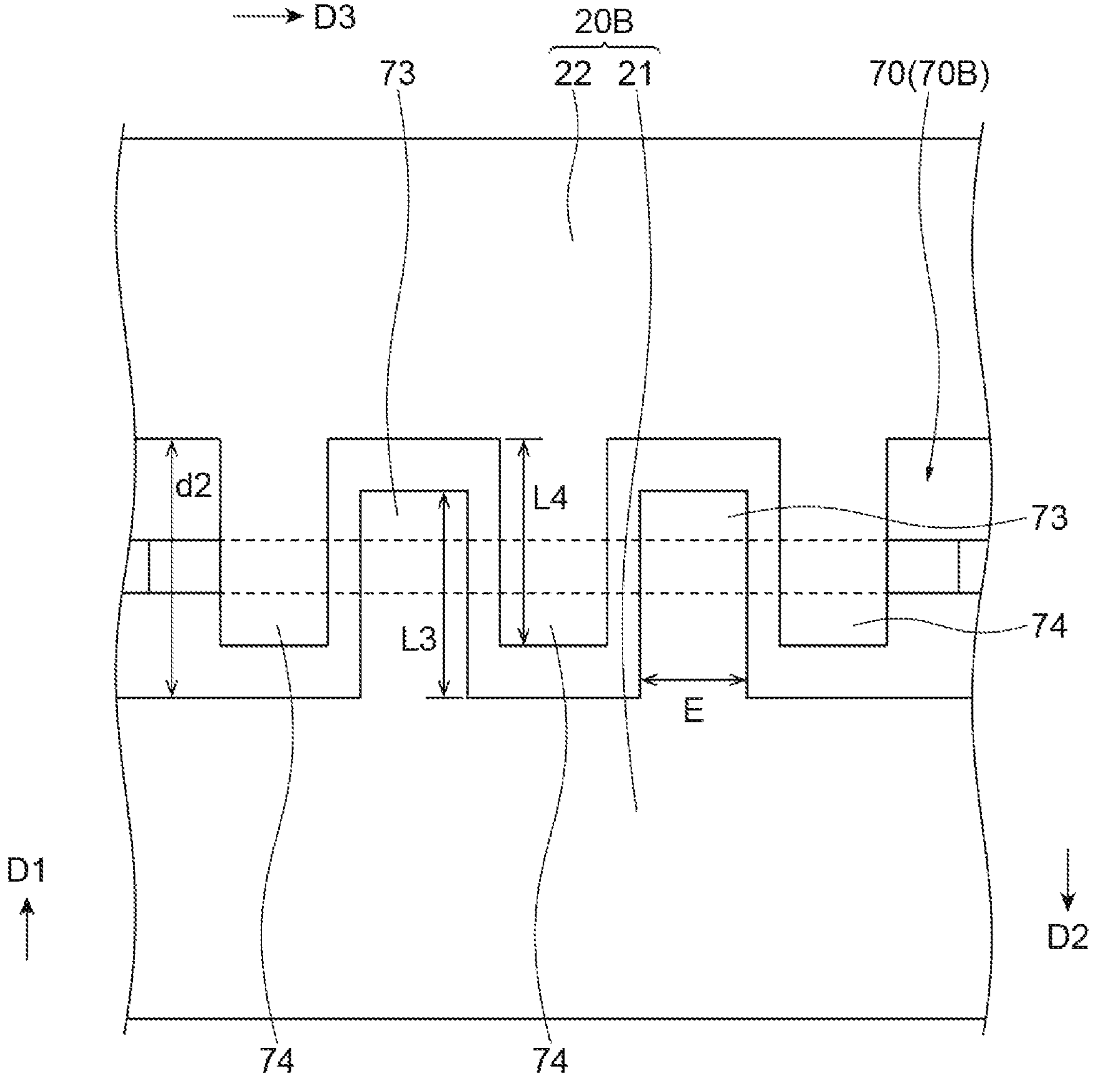
FIG. 8 is a plan view illustrating a comb teeth portion constituting a differential signal path of FIG. 6.

FIG. 8 is an enlarged plan view of the second slow wave line 70B. As illustrated in FIGS. 7 and 8, the first signal line 21 of the second transmission line 20B has a comb-shaped third comb teeth portion 73 extending toward the second signal line 22 of the second transmission line 20B. The second signal line 22 of the second transmission line 20B has a comb-shaped fourth comb teeth portion 74 extending toward the first signal line 21 of the second transmission line 20B. The second slow wave line 70B has the plurality of third comb teeth portions 73, and the plurality of third comb teeth portions 73 are aligned along the third direction D3. The width of the third comb teeth portion 73 (the length in the third direction D3) is, for example, smaller than the width of the first signal line 21 (the length in the first direction D1) and the width of the second signal line 22 (the length in the first direction D1). As an example, the number of third comb teeth portions 73 is two. However, the number of third comb teeth portions 73 is not particularly limited.

Figure 9:
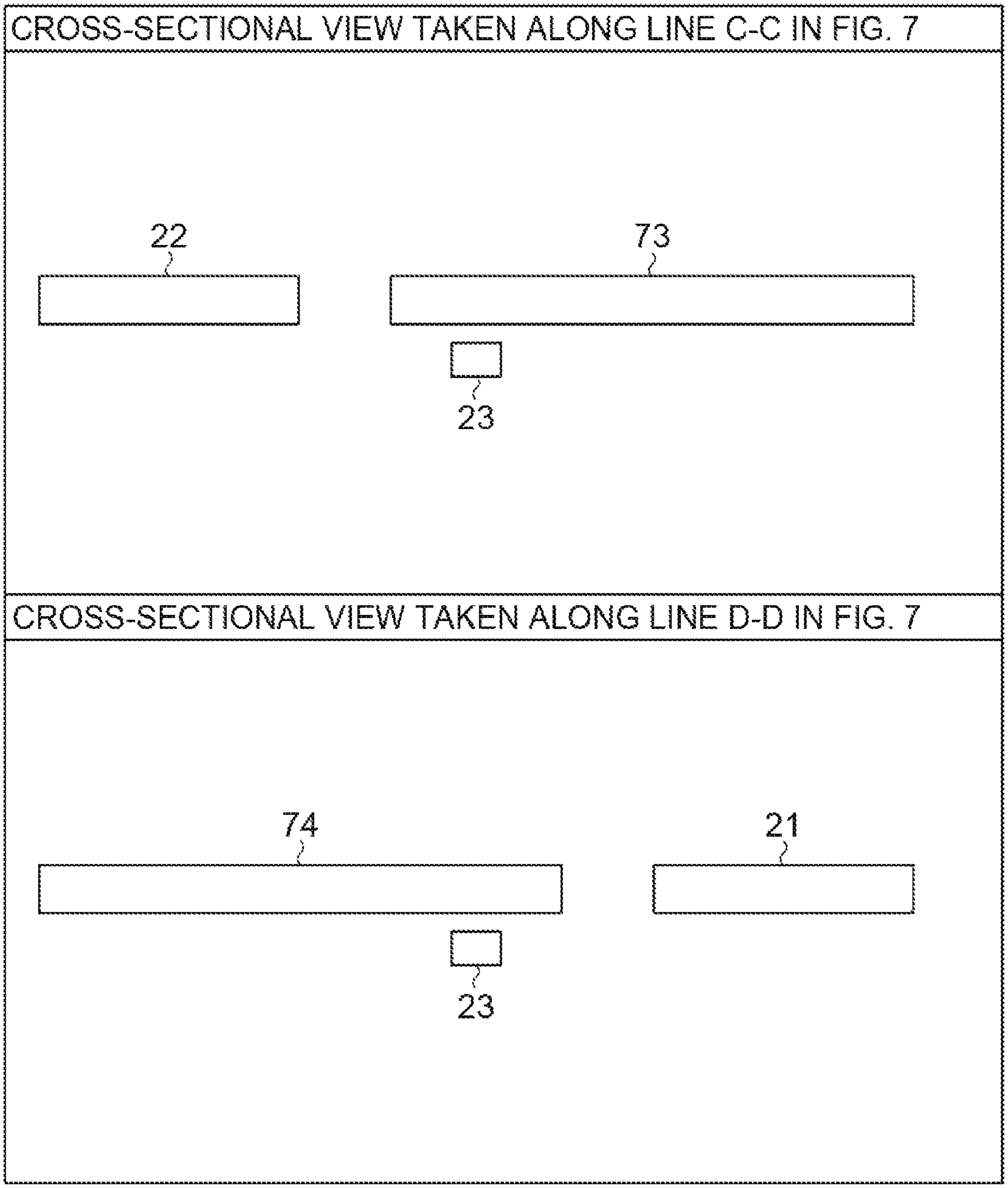
FIG. 9 is a cross-sectional view illustrating a C-C cross section and a D-D cross section of FIG. 7.

The second signal line 22 of the second transmission line 20B has the comb-shaped fourth comb teeth portion 74 extending toward the first signal line 21 of the second transmission line 20B. The second transmission line 20B has the capacitance between the third comb teeth portion 73 and the fourth comb teeth portion 74. FIG. 9 illustrates a cross-sectional view taken along line C-C in FIG. 7 and a cross-sectional view taken along line D-D in FIG. 7. As illustrated in FIG. 9, both the third comb teeth portion 73 and the fourth comb teeth portion 74 are spaced apart from the reference potential line 23. For example, the third comb teeth portion 73 and the fourth comb teeth portion 74 are located above the reference potential line 23. In the third comb teeth portion 73 and the fourth comb teeth portion 74, the capacitance C can be increased by increasing a comb teeth width E or lengths L3 and L4. Furthermore, the inductance L can be increased by increasing an interval d2 between the first signal line 21 and the second signal line 22. Therefore, similarly to the embodiment described above, the characteristic impedance $Z_0$ and the propagation velocity $v_p$ can be independently controlled. However, the lengths L3 and L4 may be ¼ or less of the wavelength λ of the high frequency signal in order to avoid an adverse effect as a stub. The same applies to the first comb teeth portion 71 and the second comb teeth portion 72 as well as a fifth comb teeth portion 75 and a sixth comb teeth portion 76 to be described later.

As illustrated in FIGS. 7 and 8, the third comb teeth portion 73 and the fourth comb teeth portion 74 constitute the second slow wave line 70B. A sum of the length L3 of the third comb teeth portion 73 in the second direction D2 and the length L4 of the fourth comb teeth portion 74 in the second direction D2 is larger than the interval d2 between the first signal line 21 and the second signal line 22 in the second transmission line 20B. The length L4 of the fourth comb teeth portion 74 in the second direction D2 may be equal to the length L3 of the third comb teeth portion 73 in the second direction D2. The second slow wave line 70B has the plurality of fourth comb teeth portions 74, and the plurality of fourth comb teeth portions 74 are aligned along the third direction D3. The third comb teeth portions 73 and the fourth comb teeth portions 74 are aligned alternately along the third direction D3. The width of the fourth comb teeth portion 74 (length in the third direction D3) is, for example, smaller than the width of the first signal line 21 and the width of the second signal line 22. As an example, the number of fourth comb teeth portions 74 is three. However, the number of fourth comb teeth portions 74 is not particularly limited.

The first signal line 21 of the third transmission line 20C has the comb-shaped fifth comb teeth portion 75 extending toward the second signal line 22 of the third transmission line 20C. The third slow wave line 70C has the plurality of fifth comb teeth portions 75, and the plurality of fifth comb teeth portions 75 are aligned along the second direction D2. The width of the fifth comb teeth portion 75 (the length in the second direction D2) is, for example, smaller than the width of the first signal line 21 (the length in the third direction D3) and the width of the second signal line 22 (the length in the second direction D2). As an example, the number of fifth comb teeth portions 75 is two. However, the number of fifth comb teeth portions 75 is not particularly limited.

The second signal line 22 of the third transmission line 20C has the comb-shaped sixth comb teeth portion 76 extending toward the first signal line 21 of the third transmission line 20C. The third transmission line 20C has the capacitance between the fifth comb teeth portion 75 and the sixth comb teeth portion 76. The fifth comb teeth portion 75 and the sixth comb teeth portion 76 constitute the third slow wave line 70C. A sum of a length L5 of the fifth comb teeth portion 75 in the third direction D3 and a length L6 of the sixth comb teeth portion 76 in the third direction D3 is larger than an interval d3 between the first signal line 21 and the second signal line 22 in the third transmission line 20C. The length L6 of the sixth comb teeth portion 76 in the third direction D3 may be equal to the length L5 of the fifth comb teeth portion 75 in the third direction D3.

The third slow wave line 70C has the plurality of sixth comb teeth portions 76, and the plurality of sixth comb teeth portions 76 are aligned along the second direction D2. The fifth comb teeth portions 75 and the sixth comb teeth portions 76 are aligned alternately along the second direction D2. The width of the sixth comb teeth portion 76 (the length in the second direction D2) is, for example, smaller than the width of the first signal line 21 and the width of the second signal line 22. As an example, the number of sixth comb teeth portions 76 is three. However, the number of sixth comb teeth portions 76 is not particularly limited.

As described above, in the optical modulator 61 according to Modified Example, the first signal line 21 of the first transmission line 20A has a comb-shaped first comb teeth portion 71 extending toward the second signal line 22 of the first transmission line 20A, and the second signal line 22 of the first transmission line 20A has a comb-shaped second comb teeth portion 72 extending toward the first signal line 21 of the first transmission line 20A. The first transmission line 20A has the capacitance between the first comb teeth portion 71 and the second comb teeth portion 72. In this case, in the first transmission line 20A, the first signal line 21 has the first comb teeth portion 71, and the second signal line 22 has the second comb teeth portion 72. Since the capacitance is formed between the first comb teeth portion 71 and the second comb teeth portion 72, the velocity of the electrical signal can be reduced in the first signal line 21. The capacitance between the first comb teeth portion 71 and the second comb teeth portion 72 can be configured with, for example, the same upper conductor layer 37 as the first signal line 21 and the second signal line 22.

In the optical modulator 61, the first signal line 21 of the second transmission line 20B has the comb-shaped third comb teeth portion 73 extending toward the second signal line 22 of the second transmission line 20B, and the second signal line 22 of the second transmission line 20B has the comb-shaped fourth comb teeth portion 74 extending toward the first signal line 21 of the second transmission line 20B. The second transmission line 20B has capacitance between the third comb teeth portion 73 and the fourth comb teeth portion 74. In this case, in the second transmission line 20B, the first signal line 21 has the third comb teeth portion 73, and the second signal line 22 has the fourth comb teeth portion 74. Since the capacitance is formed between the third comb teeth portion 73 and the fourth comb teeth portion 74, the velocity of the electrical signal can be reduced in the second transmission line 20B. The capacitance between the third comb teeth portion 73 and the fourth comb teeth portion 74 can be configured with, for example, the same upper conductor layer 37 as the first signal line 21 and the second signal line 22.

The embodiments and Modified Examples according to the present disclosure have been described above. However, the present invention is not limited to the above-described embodiments or Modified Examples, and can be changed as appropriate within the scope of the spirit described in the claims. Further, the optical modulator according to the present disclosure may be a combination of the plurality of examples among the above-described embodiments and Modified Examples. For example, configurations, shapes, sizes, materials, numbers, and arrangements of each component of the optical modulator according to the present disclosure are not limited to the embodiments or Modified Examples described above and can be changed as appropriate.

For example, in the embodiment described above, the example where the first transmission line 20A has the first slow wave line 40A, the second transmission line 20B has the second slow wave line 40B, and the third transmission line 20C has the third slow wave line 40C has been described. However, only a portion of the first transmission line 20A, the second transmission line 20B, and the third transmission line 20C may have slow wave lines. In the embodiments described above, the differential signal path 20 having the first signal line 21, the second signal line 22, and the reference potential line 23 has been described. However, when transmitting the differential signal having a pair of complementary signals through the differential signal path 20, the reference potential line 23 can be omitted, and differential signal path 20 may be the differential signal path having only the first signal line and the second signal line. For example, the differential signal has a positive phase component (positive phase signal) and a negative phase component (negative phase signal), and the negative phase signal has a phase that is 180° different from the phase of the positive phase signal. The differential signal path 20 constitutes the transmission line and has the characteristic impedance for transmission of the differential signal.

What is claimed is:

1. An optical modulator comprising:

an optical waveguide including a first waveguide portion extending in a first direction, a second waveguide portion extending in a second direction being a direction different from the first direction, and a third waveguide portion bent so as to optically couple the first waveguide portion to the second waveguide portion;

a bending portion including the third waveguide portion; and a differential signal path including a first signal line and a second signal line for driving the optical waveguide, wherein the differential signal path includes a first transmission line, a second transmission line, and an intersecting conductor portion in the bending portion, the first transmission line being configured with the first signal line and the second signal line, each extending in the first direction, the second transmission line being configured with the first signal line and the second signal line, each extending in a third direction being a direction intersecting both the first direction and the second direction, and the intersecting conductor portion connecting the first transmission line and the second transmission line to each other, and wherein at least one of the first transmission line and the second transmission line includes a slow wave line, wherein the first signal line and the second signal line constituting the second transmission line are arranged so as to interpose the third waveguide portion between the first signal line and the second signal line in a plan view.

2. The optical modulator according to claim 1, wherein the first transmission line includes the first signal line and the second signal line extending in the first direction and a first intersecting conductive pattern having a portion extending in the third direction and overlapping with the first signal line and the second signal line in a plan view.

3. The optical modulator according to claim 2, wherein the first transmission line has a plurality of the first intersecting conductive patterns, and wherein the plurality of first intersecting conductive patterns are arranged at regular intervals along the first direction and are each electrically floating.

4. The optical modulator according to claim 1, wherein the first signal line and the second signal line constituting the first transmission line are arranged so as to interpose the first waveguide portion between the first signal line and the second signal line in a plan view.

5. The optical modulator according to claim 1, wherein the second transmission line includes the first signal line and the second signal line extending in the third direction and a second intersecting conductive pattern having a portion extending in the first direction and overlapping with the first signal line and the second signal line in a plan view.

6. The optical modulator according to claim 5, wherein the second transmission line has the plurality of second intersecting conductive patterns, and wherein the plurality of second intersecting conductive patterns are arranged at regular intervals along the third direction, and each is electrically floating.

7. The optical modulator according to claim 1, wherein the first signal line of the first transmission line has a comb-shaped first comb teeth portion extending toward the second signal line of the first transmission line, wherein the second signal line of the first transmission line has a comb-shaped second comb teeth portion extending toward the first signal line of the first transmission line, and wherein the first transmission line has capacitance between the first comb teeth portion and the second comb teeth portion.

8. The optical modulator according to claim 7, wherein a sum of a length of the first comb teeth portion in the third direction and a length of the second comb teeth portion in the third direction is larger than an interval of the first signal line and the second signal line in the first transmission line.

9. The optical modulator according to claim 1, wherein the first signal line of the second transmission line has a comb-shaped third comb teeth portion extending toward the second signal line of the second transmission line, wherein the second signal line of the second transmission line has a comb-shaped fourth comb teeth portion extending toward the first signal line of the second transmission line, and wherein the second transmission line has capacitance between the third comb teeth portion and the fourth comb teeth portion.

10. The optical modulator according to claim 9, wherein a sum of a length of the third comb teeth portion in the second direction and a length of the fourth comb teeth portion in the second direction is larger than an interval between the first signal line and the second signal line in the second transmission line.

11. An optical modulator comprising:

an optical waveguide including a first waveguide portion extending in a first direction, a second waveguide portion extending in a second direction being a direction different from the first direction, and a third waveguide portion bent so as to optically couple the first waveguide portion to the second waveguide portion;

a bending portion including the third waveguide portion; and a differential signal path including a first signal line and a second signal line for driving the optical waveguide, wherein the differential signal path includes a first transmission line, a second transmission line, and an intersecting conductor portion in the bending portion, the first transmission line being configured with the first signal line and the second signal line, each extending in the first direction, the second transmission line being configured with the first signal line and the second signal line, each extending in a third direction being a direction intersecting both the first direction and the second direction, and the intersecting conductor portion connecting the first transmission line and the second transmission line to each other, wherein at least one of the first transmission line and the second transmission line includes a slow wave line, wherein the first signal line of the first transmission line has a comb-shaped first comb teeth portion extending toward the second signal line of the first transmission line, wherein the second signal line of the first transmission line has a comb-shaped second comb teeth portion extending toward the first signal line of the first transmission line, wherein the first transmission line has capacitance between the first comb teeth portion and the second comb teeth portion, and wherein a sum of a length of the first comb teeth portion in the third direction and a length of the second comb teeth portion in the third direction is larger than an interval of the first signal line and the second signal line in the first transmission line.

12. An optical modulator comprising:

an optical waveguide including a first waveguide portion extending in a first direction, a second waveguide portion extending in a second direction being a direction different from the first direction, and a third waveguide portion bent so as to optically couple the first waveguide portion to the second waveguide portion;

a bending portion including the third waveguide portion; and a differential signal path including a first signal line and a second signal line for driving the optical waveguide, wherein the differential signal path includes a first transmission line, a second transmission line, and an intersecting conductor portion in the bending portion, the first transmission line being configured with the first signal line and the second signal line, each extending in the first direction, the second transmission line being configured with the first signal line and the second signal line, each extending in a third direction being a direction intersecting both the first direction and the second direction, and the intersecting conductor portion connecting the first transmission line and the second transmission line to each other, wherein at least one of the first transmission line and the second transmission line includes a slow wave line, wherein the first signal line of the second transmission line has a comb-shaped third comb teeth portion extending toward the second signal line of the second transmission line, wherein the second signal line of the second transmission line has a comb-shaped fourth comb teeth portion extending toward the first signal line of the second transmission line, wherein the second transmission line has capacitance between the third comb teeth portion and the fourth comb teeth portion, and wherein a sum of a length of the third comb teeth portion in the second direction and a length of the fourth comb teeth portion in the second direction is larger than an interval between the first signal line and the second signal line in the second transmission line.

* * * * *